United States Patent
Ono

(10) Patent No.: US 10,395,093 B2
(45) Date of Patent: Aug. 27, 2019

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Michihiko Ono, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/591,627

(22) Filed: May 10, 2017

(65) Prior Publication Data
US 2017/0330025 A1 Nov. 16, 2017

(30) Foreign Application Priority Data
May 16, 2016 (JP) .................. 2016-098153

(51) Int. Cl.
*G06K 9/00* (2006.01)
*G06T 7/70* (2017.01)
*G06T 5/00* (2006.01)
*G06K 9/20* (2006.01)

(52) U.S. Cl.
CPC ......... *G06K 9/00228* (2013.01); *G06K 9/209* (2013.01); *G06T 5/00* (2013.01); *G06T 7/70* (2017.01); *G06T 2207/10048* (2013.01); *G06T 2207/30201* (2013.01); *G06T 2207/30242* (2013.01)

(58) Field of Classification Search
CPC ...... G06K 9/00906; G06T 2207/10048; G06T 2207/30201; G06T 2207/30242; G06T 7/70; G06T 5/00

USPC .......................................... 382/118
See application file for complete search history.

(56) References Cited

U.S. PATENT DOCUMENTS

| | | | | |
|---|---|---|---|---|
| 7,536,037 | B2 * | 5/2009 | Sung ................. | G06K 9/00255 250/339.11 |
| 7,916,971 | B2 * | 3/2011 | Bigioi ................. | G03B 19/02 382/103 |
| 2010/0128938 | A1 * | 5/2010 | Chung ................. | G06K 9/00255 382/117 |
| 2013/0342702 | A1 * | 12/2013 | Zhang ................. | G06K 9/00255 348/164 |

(Continued)

FOREIGN PATENT DOCUMENTS

JP H09-251534 A 9/1997
JP 2014-064083 A 4/2014

OTHER PUBLICATIONS

M. A. Turk, et al., "Face Recognition Using Eigenfaces", Proc. of I3 Conf. on Computer Vision and Pattern Recognition, pp. 586-591, 1991.

*Primary Examiner* — Daniel G Mariam
(74) *Attorney, Agent, or Firm* — Carter, DeLuca & Farrell LLP

(57) ABSTRACT

An image processing apparatus detects a person in a visible light image obtained by capturing that uses visible light, detects a person in an invisible light image obtained by capturing that uses invisible light in a capturing region that includes a capturing region of the visible light image, and determines that a person detected in the visible light image who is not detected in the invisible light image is a person who is actually present.

19 Claims, 6 Drawing Sheets

(56) References Cited

U.S. PATENT DOCUMENTS

| | | | |
|---|---|---|---|
| 2014/0071293 A1* | 3/2014 | Unnikrishnan | G06K 9/00221 348/164 |
| 2014/0099005 A1* | 4/2014 | Mogi | G06K 9/00288 382/118 |
| 2014/0293032 A1* | 10/2014 | Gontina | G06K 9/00771 348/77 |
| 2016/0026875 A1* | 1/2016 | Matsumoto | H04N 21/21805 348/143 |

* cited by examiner

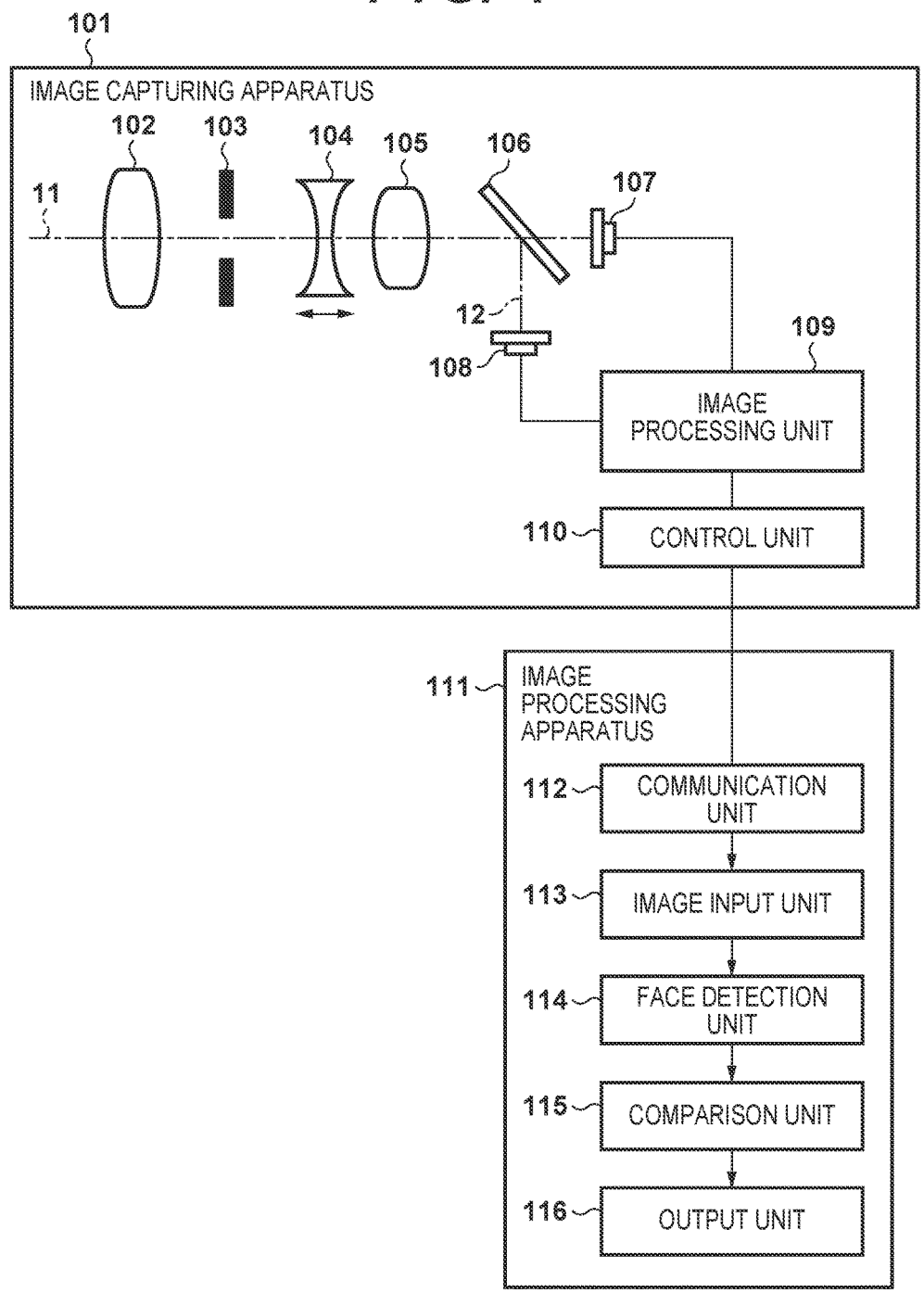

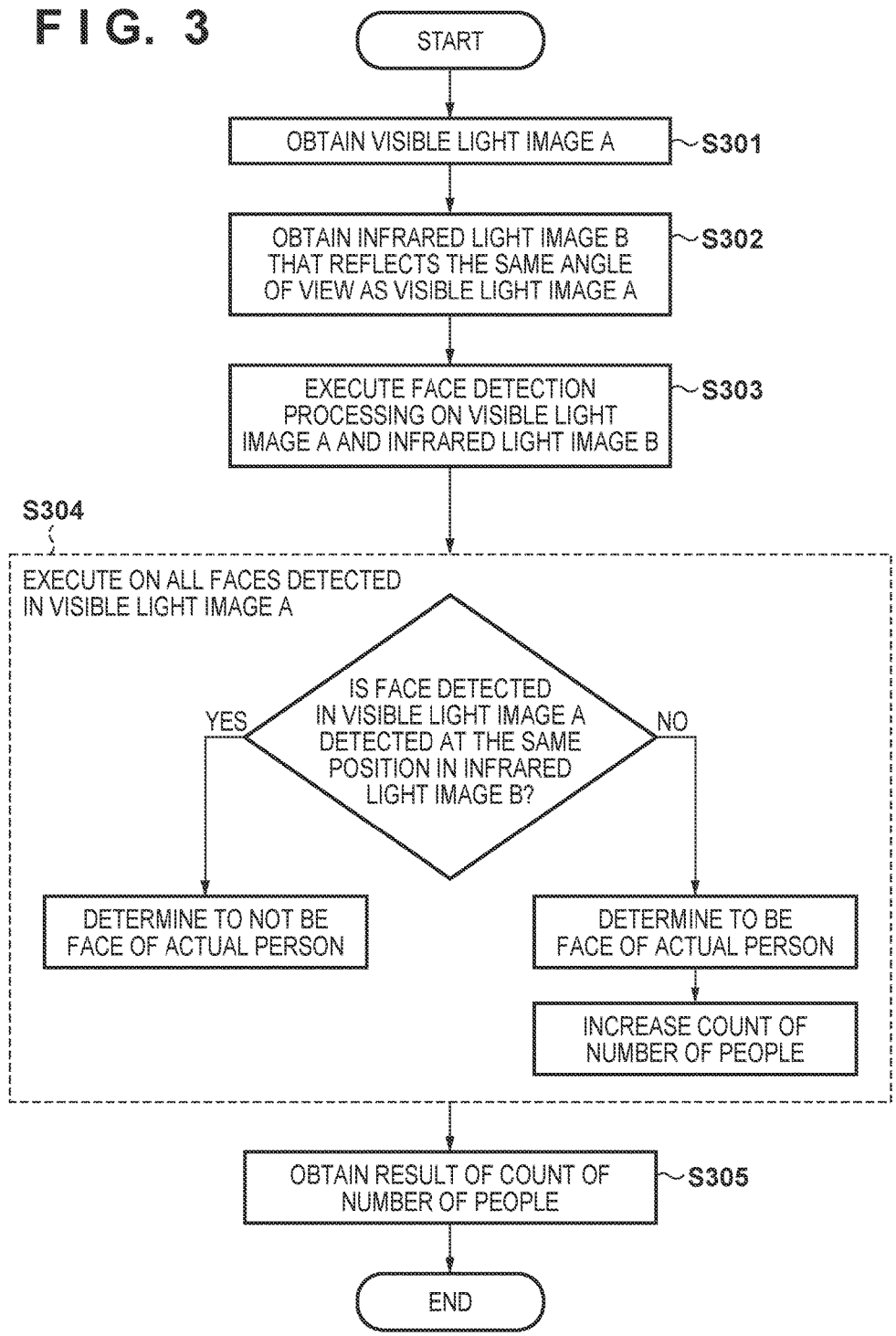

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for detecting a person from an image captured by an image capturing apparatus.

Description of the Related Art

Conventionally, there is a person detection apparatus for using a monitoring video image to detect a person region (hereinafter referred to simply as a "person") that appears in the monitoring video image. Such a person detection apparatus is typically used after being incorporated in a monitoring system. Typically a network camera is used for capturing of a monitoring video image.

As an example of a person detection method performed by a person detection apparatus, there is a method for detecting a face part of a person (for example, Japanese Patent Laid-Open No. 2014-64083). For such a method of detecting a face part, a method that uses luminance or color information of an image is typical.

In a person detection method that uses color information or luminance of an image, such as that recited in Japanese Patent Laid-Open No. 2014-64083, there is a problem such as the following. That is, there is a problem in that it is difficult to distinguish a face in a poster, monitor or the like from an actual person captured by the image capturing apparatus. Here, a face in a poster is a face in a printed article such as a poster that is captured by the image capturing apparatus. Here, a face in a monitor is a face displayed in a monitor that is captured by the image capturing apparatus.

SUMMARY OF THE INVENTION

The present invention was conceived in view of the aforementioned problem, and provides a technique for more accurately detecting a person who appears in an image.

According to one aspect of the present invention, there is provided an image processing apparatus which comprises: a first detecting unit configured to detect a person in a visible light image obtained by capturing that uses visible light; a second detecting unit configured to detect a person in an invisible light image obtained by capturing that uses invisible light in a capturing region that includes a capturing region of the visible light image; and a determination unit configured to determine that a person detected by the first detecting unit who is not detected by the second detecting unit is a person who is actually present.

Further features of the present invention will become apparent from the following description of exemplary embodiments (with reference to the attached drawings).

BRIEF DESCRIPTION OF THE DRAWINGS

FIG. 1 illustrates an example of a configuration of an image capturing apparatus and an image processing apparatus in a first embodiment.

FIG. 3 is a flowchart of an example of person detection processing in the first embodiment.

DESCRIPTION OF THE EMBODIMENTS

Below, with reference to the attached drawings, a detailed explanation is given for the present invention based on embodiments. Note that configurations illustrated in the following embodiments are merely examples, and the present invention is not limited to the illustrated configurations.

Figure 4:
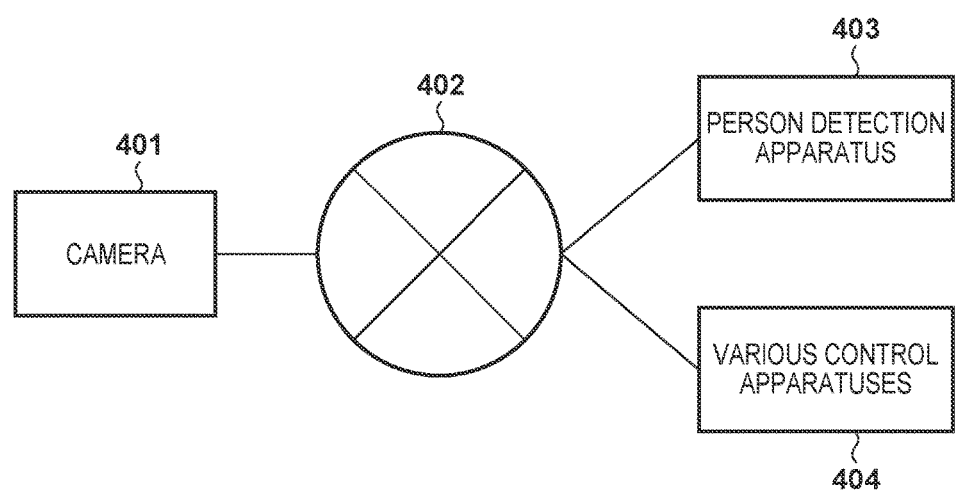
FIG. 4 is a figure illustrating a typical monitoring system configured by using a person detection apparatus.

Firstly, a typical monitoring system configured by using a network camera and a person detection apparatus is illustrated in FIG. 4. In FIG. 4, a network camera 401 is connected to a person detection apparatus 403 and various control apparatuses 404 via a network 402 such as a LAN (Local Area Network). Note that, only one network camera is illustrated in FIG. 4, but a plurality of network cameras may be connected to the person detection apparatus 403 and the various control apparatuses 404. The person detection apparatus 403 receives a monitoring video image from the network camera 401, and detects a person who appears in the monitoring video image. The various control apparatuses 404, for example, receives the monitoring video image from the network camera 401, and can display an image that causes a person detection result by the person detection apparatus 403 to be reflected in the monitoring video image on a display apparatus (not shown) that is connected separately. Also, the various control apparatuses 404 can, in accordance with the person detection result by the person detection apparatus 403, save the monitoring video image received from the network camera 401 to a data storage apparatus (not shown) that is separately connected. Note that, the person detection apparatus 403 and the various control apparatuses 404 are divided into two apparatuses in the example of FIG. 4, but functions of both can be arranged in the same apparatus.

Figure 5A:
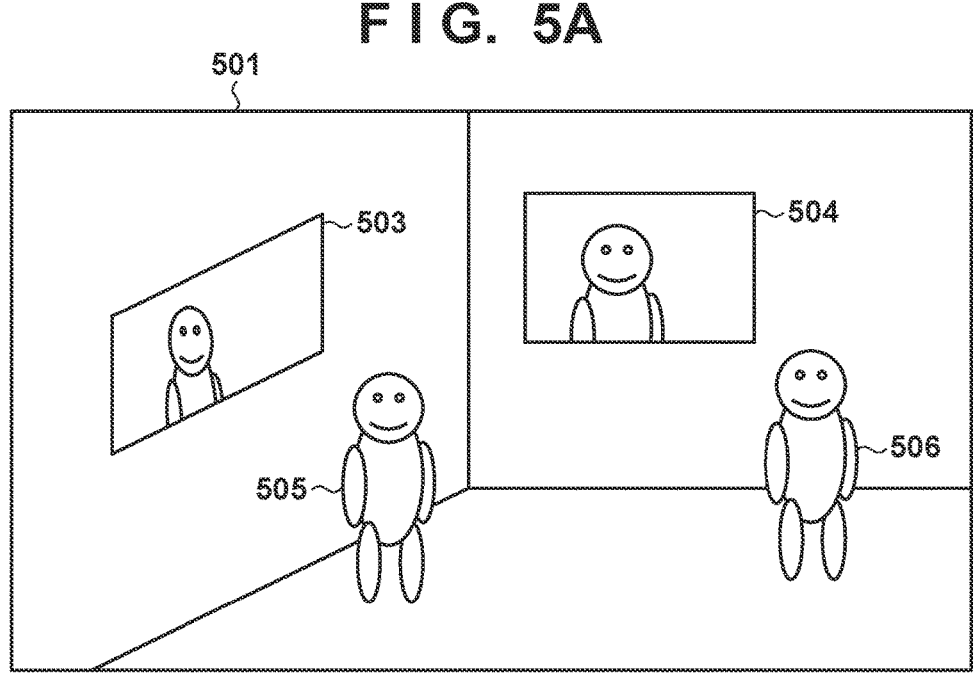
FIGS. 5A and 5B are figures for explaining an example of a conventional person detection method.
Figure 5B:
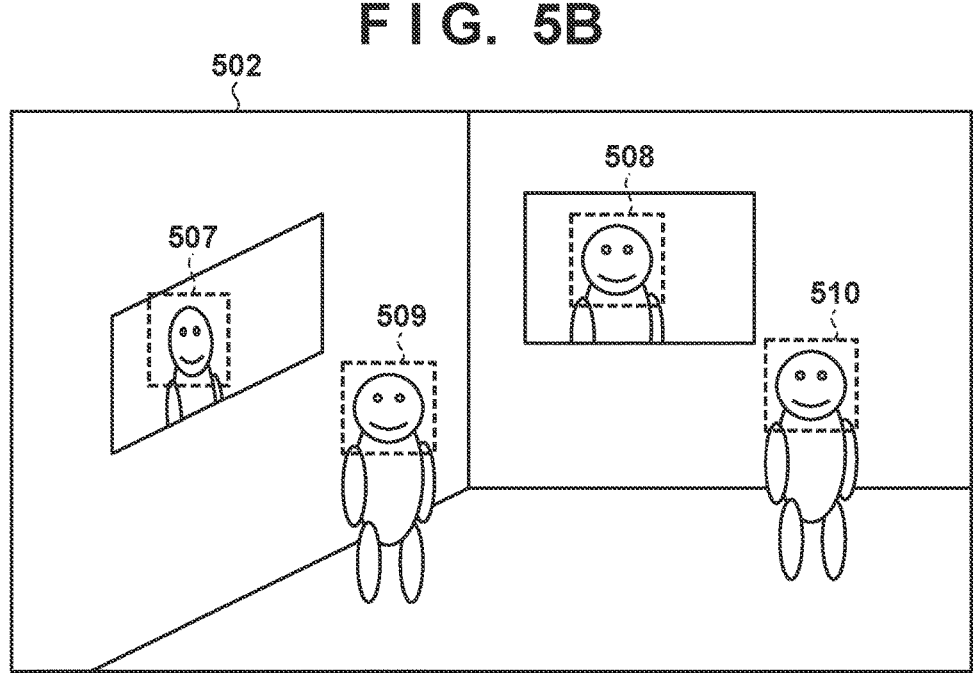

Here explanation will be given in detail using FIGS. 5A and 5B for the problem, as recited in Japanese Patent Laid-Open No. 2014-64083, in a person detection method that uses luminance and color information of an image. FIGS. 5A and 5B are figures for explaining an example of a conventional person detection method.

In FIG. 5A, an image 501 is an image captured with a particular angle of view. In the image 501, a poster 503, a poster 504, a person 505 and a person 506 appear. The poster 503 and the poster 504 are posters in which people are printed, and the person 505 and the person 506 are actual people who are actually present. An image 502 in which faces 507 to 510 of people are detected with respect to the image 501 by using the luminance and color information in the image is illustrated in FIG. 5B. From the perspective of luminance and color information in the image, a person who appears in a poster (the face 507 and the face 508) and an actual person (the face 509 and the face 510) are seen to be the same. Therefore, as illustrated in the image 502, all the faces 507 to 510 are detected as "a face of a person". However, in fact, because the faces 507 and 508 are faces that appear in a poster (faces of a printed article on a poster), these do not correspond to an actual person. Such a person detection technique is incompatible with a monitoring system for detecting only an actual person.

Below, explanation will be given for an embodiment for accurately detecting a person who appears in an image.

First Embodiment

FIG. 1 illustrates an example of a configuration of an image capturing apparatus 101 and an image processing apparatus 111 in a first embodiment. Note that, in FIG. 1, some configuration elements of the image capturing apparatus 101 are omitted. Also, the image capturing apparatus 101 can capture moving images and still images. An image processing apparatus 111 functions as a person detection apparatus in the present embodiment.

Firstly, explanation will be given for a configuration of the image capturing apparatus 101. In the image capturing apparatus 101 an objective lens 102, an imaging aperture 103, a focus lens 104 and an imaging lens 105 are arranged sequentially on an optical axis 11, and a dichroic mirror 106 is arranged at the rear of these. When a light enters, it is focused by the objective lens 102 and enters the imaging aperture 103. The light having passed the imaging aperture 103 enters a lens system configured by the focus lens 104 and the imaging lens 105. The light having passed the lens system is incident on the dichroic mirror 106 for wavelength separation.

The dichroic mirror 106 is configured so as to transmit visible light and reflect infrared light. Note that infrared light is one of examples, and other invisible light can be used instead of infrared light. Note that, as an example, it is assumed that the visible light is light whose wavelength is less than approximately 800 nm, and the infrared light is light whose wavelength is greater than or equal to 800 nm. Therefore, in the present embodiment, it is assumed that the dichroic mirror 106 is configured so as to transmit light whose wavelength is less than 800 nm, and reflect light whose wavelength is greater than or equal to 800 nm. Note that, it is assumed that visible light may include ultraviolet light in the present embodiment. Also, configuration may be taken such that the dichroic mirror 106 reflects only light of a specific range of wavelengths. For example, configuration may be taken so as to reflect only light whose wavelength is from 900 nm to 1300 nm.

The visible light transmitted by the dichroic mirror 106 is incident on a visible light image capturing element 107 arranged to the rear of the dichroic mirror 106. The visible light image capturing element 107 receives the incident visible light, and generates an image signal (a visible light image signal) by converting the received visible light into an electric charge.

Meanwhile, the infrared light component reflected by the dichroic mirror 106 travels on an optical axis 12 and is incident on an infrared light image capturing element 108. The infrared light image capturing element 108 receives incident infrared light, and generates an image signal (an infrared light image signal) by converting the received infrared light into an electric charge.

Note that, the visible light image capturing element 107 and the infrared light image capturing element 108 can use a CMOS image sensor (Complementary Metal Oxide Semiconductor Image Sensor), for example. Also, the visible light image capturing element 107 and the infrared light image capturing element 108 may use a CCD image sensor (Charge Coupled Device Image Sensor). Also, the visible light image capturing element 107 and the infrared light image capturing element 108 are arranged at approximately conjugate positions to cause image formation to be similar, but the infrared light image capturing element 108 is arranged to be displaced to the rear on the light path because the in-focus position would be misaligned in accordance with the difference of the wavelength between the infrared light and the visible light. Additionally, the image capturing apparatus 101 can have an illuminant configured by an LED (Light Emitting Diode) light source to emit a near-infrared ray (not shown).

The outputs of the visible light image capturing element 107 and the infrared light image capturing element 108 are processed into image data in an image processing unit 109. This image data is, for example, color space information such as YCbCr, RGB or YUV that a typical image processing apparatus can use, or image data that has been subject to compression processing such as MotionJPEG compression or h.264 compression. The image processing unit 109 generates, as a visible light image and an infrared light image, data resulting from performing processing such as this on the output from the visible light image capturing element 107 and the infrared light image capturing element 108.

The visible light image and the infrared light image generated by the image processing unit 109 are sent to a control unit 110. The control unit 110 can transfer the visible light image and the infrared light image to an external apparatus such as an external storage or an external computer which is connected via a network such as the LAN. Also, the control unit 110 can receive an instruction from the external apparatus for a start or an end of capturing with respect to the image capturing apparatus 101, and perform control corresponding to the instruction in the image capturing apparatus 101.

Thus, the image capturing apparatus 101 can generate the visible light image that images the received visible light and the infrared light image that images the received infrared light by having the visible light image capturing element 107 and the infrared light image capturing element 108. In addition, these images have the same angle of view.

Here, explanation will be given for the infrared light image generated by the image capturing apparatus 101. Typically, for the skin of a person, absorption becomes high from around a wavelength of 1000 nm, and skin demonstrates high absorption in comparison to clothing or the like with wavelengths of 1400 to 1600 nm. Therefore, in the infrared light image, a person appears black (refer to FIG. 2 which is described later). On the other hand, a black type ink (such the carbon black) for showing shades of gray or a black color of a printed article appears in the infrared light image similarly to the way it does in the visible image. Therefore, in the infrared light image, a person on the printed article is an image similar to the visible image even if an outline and a contrast are emphasized.

Next, explanation will be given for a configuration of the image processing apparatus 111. A communication unit 112 obtains the visible light image and the infrared light image generated by the image capturing apparatus 101. Note that, in the present embodiment, the visible light image and the infrared light image are images based on image captures having the same angle of view. Therefore, the visible light image and the infrared light image are images having the same capturing region. In addition, in the present embodiment, the visible light image and the infrared light image are images based on capturing at the same timing.

An image input unit 113 performs data decompression processing as needed on the visible light image and the infrared light image obtained by the communication unit 112, and sends them to a face detection unit 114. The face detection unit 114 performs face detection processing as person detection processing on the images received from the image input unit 113.

As an example of the face detection processing performed in the face detection unit 114, there is a method that uses eigenfaces in accordance with principal component analysis. This method is recited in, for example, "M. A. Turk and A. P. Pentland, "Face Recognition Using Eigenfaces", Proc. of I3 Conf. on Computer Vision and Pattern Recognition, pp. 586-591, 1991.". Also, as indicated in Japanese Patent Laid-Open No. H9-251534, configuration may be taken so as to perform the face detection processing by a method that uses feature points such as eyes, a nose and a mouth. These methods determine whether or not an input image is a face of a person by a method of pattern matching between an input image and a plurality of standard patterns. The result of the face detection in the face detection processing may be feature point information of a face image (an outline shape of a nose/mouth/face, the size of each, positions of feature points, and the like). Note that, because the face detection processing itself can be realized by a publicly known technique as previously explained, here, detailed explanation thereof is omitted. Note that, respectively different face detection methods and parameters may be used with respect to the visible light image and the infrared light image. For example, because there are many cases in which the infrared light image is monochrome, a face detection method and parameters suited to a monochrome image may be used.

Figure 2A:
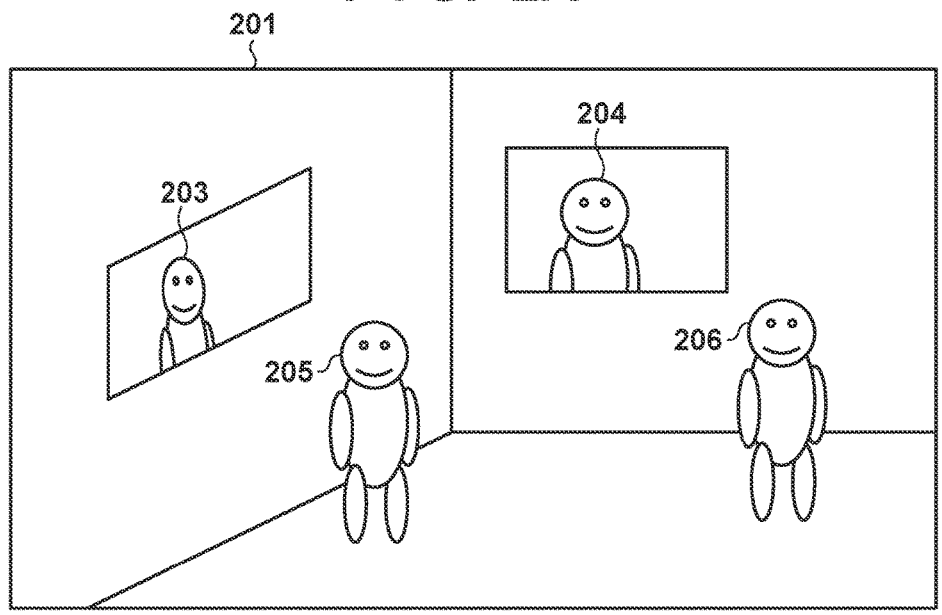
FIGS. 2A and 2B are figures for explaining face detection processing in the first embodiment.
Figure 2B:
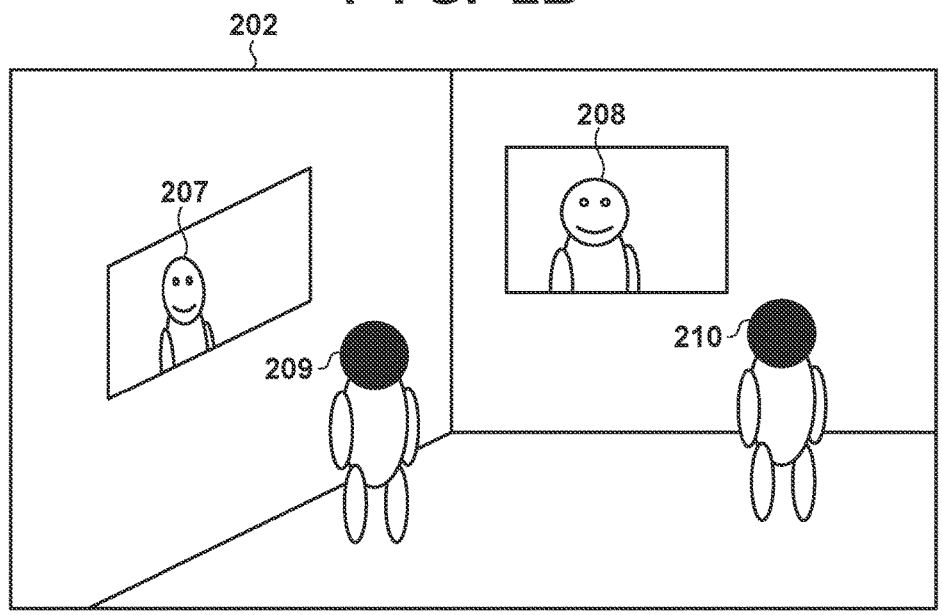

Here, explanation will be given for the face detection processing by the face detection unit 114 with reference to FIGS. 2A and 2B. FIGS. 2A and 2B are figures for explaining a face detection result in the present embodiment. In FIG. 2A, a visible light image 201 is illustrated. As a result of the face detection processing by the face detection unit 114 on the visible light image 201, faces 203 to 206 are output as detection results. Meanwhile, in FIG. 2B, an infrared light image 202 is illustrated. As a result of the face detection processing by the face detection unit 114 on the infrared light image 202, a face 207 and a face 208 are output as detection results. Because the skin of an actual person appears black, a face 209 and a face 210 are not output as a detection result.

A detection result for the visible light image and a detection result for the infrared light image that are output from the face detection unit 114 are compared by a comparison unit 115. The comparison unit 115 by comparing the two detection result determines, from people (faces) detected in the visible light image, a person (face) which has not been detected in the infrared light image as an actual person.

With reference to FIGS. 2A and 2B, for example, the comparison unit 115 determines regions (the regions of the faces 205 and 206) resulting from subtracting the regions of the face 207 and the face 208 detected in the infrared light image 202 from the regions of the faces 203 to 206 detected in the visible light image 201, as faces of actual people.

Also, the comparison unit 115 may determine whether or not a face is detected in the infrared light image 202 at the same position as the position of a face detected in the visible light image. In such a case, if a face is detected at the same position, the comparison unit 115 determines that the face detected in the visible light image is not the face of an actual person. However, there are cases in which slight misalignment occurs for the positions of faces detected in the visible light image and the infrared light image. Therefore, configuration may be taken to determine "the same position" if it is within a predetermined amount of misalignment. In contrast, if a face is not detected at the same position, that is, if a face is only detected in the visible image, the comparison unit 115 determines that the face detected in the visible light image is the face of an actual person. With reference to FIGS. 2A and 2B, for example, because the face 207 is detected in the infrared light image 202 at the position of the face 203 detected in the visible light image 201, the comparison unit 115 determines that the face 203 is not the face of an actual person. In addition, because a face is not detected in the infrared light image 202 at the position of the face 205 detected in the visible light image 201, the comparison unit 115 determines that the face 205 is the face of an actual person.

The person information determined by the comparison unit 115 is sent to an output unit 116. The output unit 116 tallies the person information, and outputs a tally result to a display apparatus (not shown) which is connected separately. The output unit 116 can also store the tally result in an external storage (not shown) which is connected separately.

Follow, with reference to FIG. 3, explanation will be given for person detection processing by the image processing apparatus 111. FIG. 3 is a flowchart of an example of person detection processing in the present embodiment.

Firstly, the image processing apparatus 111 obtains a visible light image A from the image capturing apparatus 101 (step S301). Then, the image processing apparatus 111 obtains the infrared light image B from the image capturing apparatus 101 (step S302). These image obtainment processes perform obtainment sequentially or the same time from the image capturing apparatus via the network. Note that, the order of the process of step S301 and step S302 may also be inverse. Then, the image processing apparatus 111 performs the face detection processing described above, on the obtained visible light image A and infrared light image B (step S303).

After the face detection processing (step S303), the image processing apparatus 111 compares to see whether or not all faces detected in the visible light image A are detected in the infrared light image B (step S304). For example, the image processing apparatus 111 compares to see whether or not a face detected in the visible light image A is detected at the same position in the infrared light image B. If it is detected at the same position, the image processing apparatus 111 determines that the face detected in the visible light image A is not the face of an actual person. In contrast, if it is not detected at the same position, that is, if it is only detected in the visible image, the image processing apparatus 111 determines that the face detected in the visible light image A is the face of an actual person. According to the determination result, if it is determined to be the face of an actual person, a count of the number of people is increased by one. By the above processing, the image processing apparatus 111 obtains a result of the count of the number of people for actual people present in the same angle of view (step S305).

In this fashion, according to the present embodiment, even if a person printed in a printed article such as a poster and an actual person who is actually present coexist in the same image, it is possible to detect only the actual person. Therefore, by the image capturing apparatus and the image processing apparatus in the present embodiment, it is possible to realize a monitoring system such that only an actual person is detected and counted from among captured monitoring image.

Second Embodiment

Figure 6:
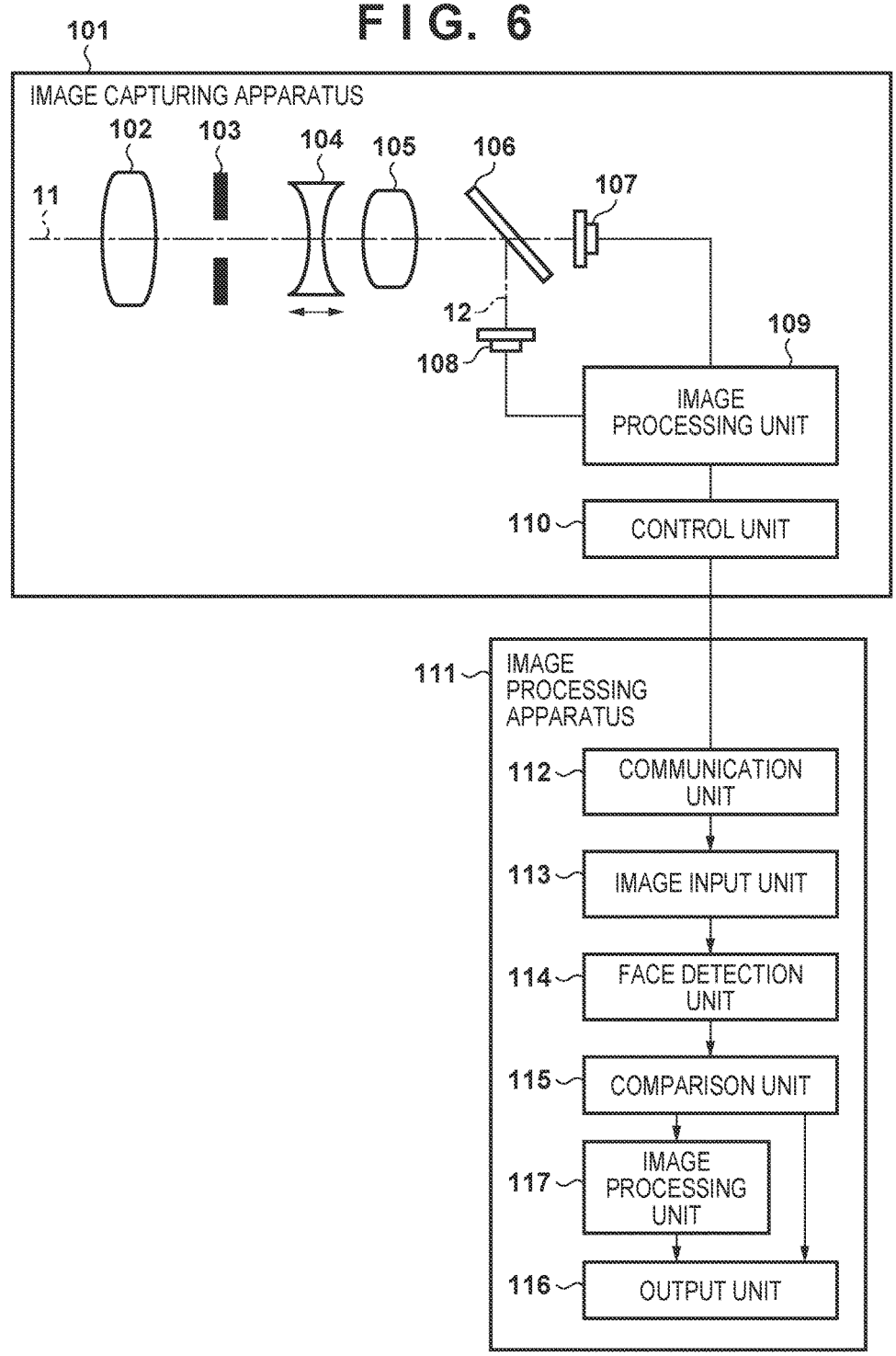
FIG. 6 illustrates an example of a configuration of an image capturing apparatus and an image processing apparatus in a second embodiment.

FIG. 6 illustrates an example of a configuration of the image capturing apparatus 101 and the image processing apparatus 111 in a second embodiment. The difference with FIG. 1 explained in the first embodiment is that an image processing unit 117 has been added. The image processing unit 117 performs various image processing on a region in a visible light image where an actual person (a face of an actual person) is determined to be present. For example, the image processing unit 117 may overlap (over lay) a mask image for privacy protection on a region where an actual person is determined to be present. Overlapping the mask image is effective in a situation where the actual person does not want to be viewed. In addition, the image processing unit 117 may perform image processing so as to set an image quality (for example, resolution, tonality, compression rate) of the region where an actual person is determined to be present to be higher than the image quality of other regions. By setting the image quality higher, it is possible to view the detected actual person more accurately. An image to which the image processing unit 117 has applied image processing can be output to an external apparatus via the output unit 116.

Thus, according to the present embodiment, in addition to the effects described in the first embodiment, it is possible to generate an image conforming to handling of a detected actual person.

Other Embodiments

In the embodiments described above explanation was given of examples in which a person is detected, but the present embodiments can be applied to an example of detecting photographic subjects that appear differently between a visible light image and an infrared light image. In addition, although the embodiments described above explained examples of detecting a person by detecting a face, there is no limitation to a face, and detection of a person may be performed by detecting another part of the body. In addition, although explanation was given of an example of using visible light and infrared light in the embodiments described above, non-visible light other than infrared light can be substituted for infrared light. In addition, in the embodiments described above, although a visible light image and an infrared light image were given as images of the same capturing region, they do not need to be exactly the same. For example, the capturing region of the visible light image may be included in the capturing region of the infrared light image.

In addition, the image processing apparatus 111 may store information of faces determined to not be faces of actual people, out of faces detected in the visible light image. In such a case, for example the image processing apparatus 111 does not need the processing of the comparison unit 115, and can determine a face that is not a face of an actual person in a newly obtained visible light image. The image processing apparatus 111 can also output, via the output unit 116, the information of faces thus determined not to be faces of actual people for various purposes.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-098153, filed May 16, 2016, which is hereby incorporated by reference herein in its entirety.

What is claimed is:

1. An image processing apparatus, comprising:
one or more processors; and
one or more memories storing instructions which, when executed by the one or more processors, cause the image processing apparatus to:
perform first detection for detecting a person in a visible light image obtained by capturing that uses visible light;
perform second detection for detecting a person in an invisible light image obtained by capturing that uses invisible light in a capturing region that includes a capturing region of the visible light image; and
determine, if a person is not detected in the second detection at a position that corresponds to a position of a person detected in the first detection, that the person detected in the first detection is actually present.

2. The image processing apparatus according to claim 1, wherein the instructions, when executed by the one or more processors, further cause the image processing apparatus to perform image processing on a region in the visible light image that includes the person who is actually present.

3. The image processing apparatus according to claim 2, wherein the instructions, when executed by the one or more processors, further cause the image processing apparatus to overlap a mask image on the region of the person who is actually present.

4. The image processing apparatus according to claim 2, wherein the instructions, when executed by the one or more processors, further cause the image processing apparatus to perform processing to increase an image quality of the region of the person who is actually present.

5. The image processing apparatus according to claim 1, wherein in the first detection and the second detection, the instructions, when executed by the one or more processors, cause the image processing apparatus to detect a person by detecting a face of the person.

6. The image processing apparatus according to claim 1, wherein the instructions, when executed by the one or more processors, further cause the image processing apparatus to count and output a number of people who are actually present.

7. The image processing apparatus according to claim 6, wherein the instructions, when executed by the one or more processors, further cause the image processing apparatus to:
   determine that a person detected by the first detection who is detected by the second detection is a person that is not actually present, and
   output information of the person that is not actually present.

8. The image processing apparatus according to claim 1, wherein the invisible light is infrared light.

9. An image processing method, comprising:
   performing first detection for detecting a person in a visible light image obtained by capturing that uses visible light;
   performing second detection for detecting a person in an invisible light image obtained by capturing that uses invisible light in a capturing region that includes a capturing region of the visible light image; and
   determining, if a person is not detected in the second detection at a position that corresponds to a position of a person detected in the first detection, that the person detected in the first detection is actually present.

10. A non-transitory computer-readable storage medium storing a computer program for causing a computer to execute a control method of an image processing, the method comprising:
   performing first detection for detecting a person in a visible light image obtained by capturing that uses visible light;
   performing second detection for detecting a person in an invisible light image obtained by capturing that uses invisible light in a capturing region that includes a capturing region of the visible light image; and
   determining, if a person is not detected in the second detection at a position that corresponds to a position of a person detected in the first detection, that the person detected in the first detection is actually present.

11. An image processing apparatus, comprising:
   one or more processors; and
   one or more memories storing instructions which, when executed by the one or more processors, cause the image processing apparatus to:
      perform first detection for detecting a person in a visible light image obtained by capturing that uses visible light;
      perform second detection for detecting a person in an invisible light image obtained by capturing that uses invisible light in a capturing region that includes a capturing region of the visible light image; and
      perform image processing on a region of a person in the visible light image who is detected by the first detection at a position that corresponds to a position where a person is not detected by the second detection and not on a region of a person in the visible light image who is detected by the first detection at a position that corresponds to a position where a person is detected by the second detection.

12. The image processing apparatus according to claim 11, wherein the image processing on the region is overlapping a mask image on the region.

13. The image processing apparatus according to claim 11, wherein the image processing on the region is increasing an image quality of the region.

14. An image processing apparatus which perform person detection, comprising:
   one or more processors; and
   one or more memories storing instructions which, when executed by the one or more processors, cause the image processing apparatus to:
      perform first detection for detecting a person in a visible light image obtained by capturing that uses visible light;
      perform second detection for detecting a person in an invisible light image obtained by capturing that uses invisible light in a capturing region that includes a capturing region of the visible light image; and
      output information related to result of the person detection, the result including a person detected by the first detection at a position that corresponds to a position where a person is not detected by the second detection and not including a person detected by the first detection at a position that corresponds to a position where a person is detected by the second detection.

15. The image processing apparatus according to claim 14, wherein the information related to the result of the person detection is information indicating the number of a person detected by the first detection at a position that corresponds to a position where a person is not detected by the second detection.

16. An image processing method, comprising:
   performing first detection for detecting a person in a visible light image obtained by capturing that uses visible light;
   performing second detection for detecting a person in an invisible light image obtained by capturing that uses invisible light in a capturing region that includes a capturing region of the visible light image; and
   performing image processing on a region of a person in the visible light image who is detected by the first detection at a position that corresponds to a position where a person is not detected by the second detection and not on a region of a person in the visible light image who is detected by the first detection at a position that corresponds to a position where a person is detected by the second detection.

17. A non-transitory computer-readable storage medium storing a computer program for causing a computer to execute a control method of an image processing, the method comprising:
   performing first detection for detecting a person in a visible light image obtained by capturing that uses visible light;
   performing second detection for detecting a person in an invisible light image obtained by capturing that uses invisible light in a capturing region that includes a capturing region of the visible light image; and
   performing image processing on a region of a person in the visible light image who is detected by the first detection at a position that corresponds to a position where a person is not detected by the second detection and not on a region of a person in the visible light image who is detected by the first detection at a position that corresponds to a position where a person is detected by the second detection.

18. A non-transitory computer-readable storage medium storing a computer program for causing a computer to execute a control method of an image processing, the method comprising:

performing first detection for detecting a person in a visible light image obtained by capturing that uses visible light;

performing second detection for detecting a person in an invisible light image obtained by capturing that uses invisible light in a capturing region that includes a capturing region of the visible light image; and outputting information related to result of the person detection, the result including a person detected by the first detection at a position that corresponds to a position where a person is not detected by the second detection and not including a person detected by the first detection at a position that corresponds to a position where a person is detected by the second detection.

19. An image processing method, comprising:

performing first detection for detecting a person in a visible light image obtained by capturing that uses visible light;

performing second detection for detecting a person in an invisible light image obtained by capturing that uses invisible light in a capturing region that includes a capturing region of the visible light image; and outputting information related to result of the person detection, the result including a person detected by the first detection at a position that corresponds to a position where a person is not detected by the second detection and not including a person detected by the first detection at a position that corresponds to a position where a person is detected by the second detection.

* * * * *